United States Patent [19]

Zinser et al.

[11] Patent Number: 5,710,781
[45] Date of Patent: Jan. 20, 1998

[54] ENHANCED FADING AND RANDOM PATTERN ERROR PROTECTION FOR DYNAMIC BIT ALLOCATION SUB-BAND CODING

[75] Inventors: Richard L. Zinser; Steven R. Koch, both of Niskayuna, N.Y.

[73] Assignee: Ericsson Inc., Research Triangle Park, N.C.

[21] Appl. No.: 460,000

[22] Filed: Jun. 2, 1995

[51] Int. Cl.⁶ .......................................................... H04L 1/00
[52] U.S. Cl. .................................................................. 371/31
[58] Field of Search ................................. 371/30, 31, 5.5

[56] References Cited

U.S. PATENT DOCUMENTS

| | | | |
|---|---|---|---|
| 4,054,863 | 10/1977 | Goodman et al. | 371/31 |
| 4,156,867 | 5/1979 | Bench et al. | 371/37.7 |
| 4,291,405 | 9/1981 | Jayant et al. | 371/31 |
| 4,375,581 | 3/1983 | Jayant | 375/241 |
| 4,516,258 | 5/1985 | Ching et al. | 395/2.38 |
| 4,538,234 | 8/1985 | Honda et al. | 395/2.38 |
| 4,549,296 | 10/1985 | Castel et al. | 395/183.21 |
| 4,622,680 | 11/1986 | Zinser | 375/245 |
| 4,670,880 | 6/1987 | Jitsukawa et al. | 371/36 |
| 4,688,224 | 8/1987 | Dal Degan et al. | 371/31 |
| 4,747,104 | 5/1988 | Piret | 371/38.1 |
| 4,802,171 | 1/1989 | Rasky | 371/43 |
| 4,805,193 | 2/1989 | McLaughlin et al | 375/27 |
| 4,809,274 | 2/1989 | Walker et al. | 371/37.1 |
| 4,831,624 | 5/1989 | McLaughlin et al. | 371/37.1 |
| 4,907,277 | 3/1990 | Callens et al. | 395/2.11 |
| 4,956,871 | 9/1990 | Swaminathan | 395/2.38 |
| 5,054,025 | 10/1991 | Galand et al. | 371/49.1 |
| 5,148,431 | 9/1992 | Hayashi | 371/5.1 |
| 5,271,011 | 12/1993 | McMullan, Jr. et al. | 371/5.3 |
| 5,309,443 | 5/1994 | Schorman | 371/5.5 |
| 5,384,793 | 1/1995 | Zinser | 371/69.1 |
| 5,402,447 | 3/1995 | Roney, IV | 375/340 |
| 5,416,788 | 5/1995 | Carey | 371/45 |
| 5,450,248 | 9/1995 | Van Eijck et al. | 360/32 |
| 5,473,727 | 12/1995 | Nishiguchi et al. | 395/2.31 |

FOREIGN PATENT DOCUMENTS

| | | |
|---|---|---|
| 0 553 538 | 8/1993 | European Pat. Off. |
| 41 11 131 | 10/1992 | Germany . |
| WO 88/10035 | 12/1988 | WIPO . |
| WO88/009967 | 12/1988 | WIPO . |

OTHER PUBLICATIONS

McLaughlin et al., "Speech and Channel Coding for Digital Land–Mobile Radio", IEEE Journ. on Selected Areas in Communications, vol. 6, No. 2, Feb. 1988, pp. 332–345, Feb. 1988.

Cox et al., "A Sub-Band Coder Designed for Combined Source and Channel Coding", ICASSP '88, pp. 235–238, Sep. 1988.

(List continued on next page.)

*Primary Examiner*—Stephen M. Baker
*Attorney, Agent, or Firm*—Nixon & Vanderhye P.C.

[57] ABSTRACT

A method for correcting random errors, and detecting and replacing fading errors in radio frequency (RF) digital transmissions, such as voice transmission. In a Dynamic Bit Allocation Sub-Band Coder (DBASBC), bits corresponding to sub-band energy levels are protected before transmission. If the bit error rate detected for a current speech frame is sufficiently high for a sufficient period of time, the band energies for the speech frame are zeroed thereby effectively muting the speech coder output for that frame. If muting is not required but there still exists a bit error condition detected as a fade, the speech frame is deemed corrupted. As a result, the energies for the bands in the current speech frame are selectively replaced with the band energies from the previous frame (assuming the previous frame band energies are reasonable values). Otherwise, the individual band energies are examined one by one. If the individual band energy requires correction, the band energies are replaced individually. In addition, the energy replacement values are checked for reasonableness.

21 Claims, 8 Drawing Sheets

OTHER PUBLICATIONS

Hagenaeuer et al., "Variable-Rate Sub-Band Speech Coding and Matched Channel Coding for Mobile Radio Channels", 1988 Conf. on Vehicular Technology, pp. 139-146, Sep. 1988.

Wong et al., "Estimating Unreliable Packets in Subband Coded Speech", GLOBECOM '90, pp. 1979-1983, Apr. 1990.

Hanzo et al., "A Subband Coding, BCH Coding, and 16-QAM System for Mobile Radio Speech Communications", IEEE Trans. on Vehicular Technology, Vol. 39, No. 4, Nov. 1990, pp. 327-339.

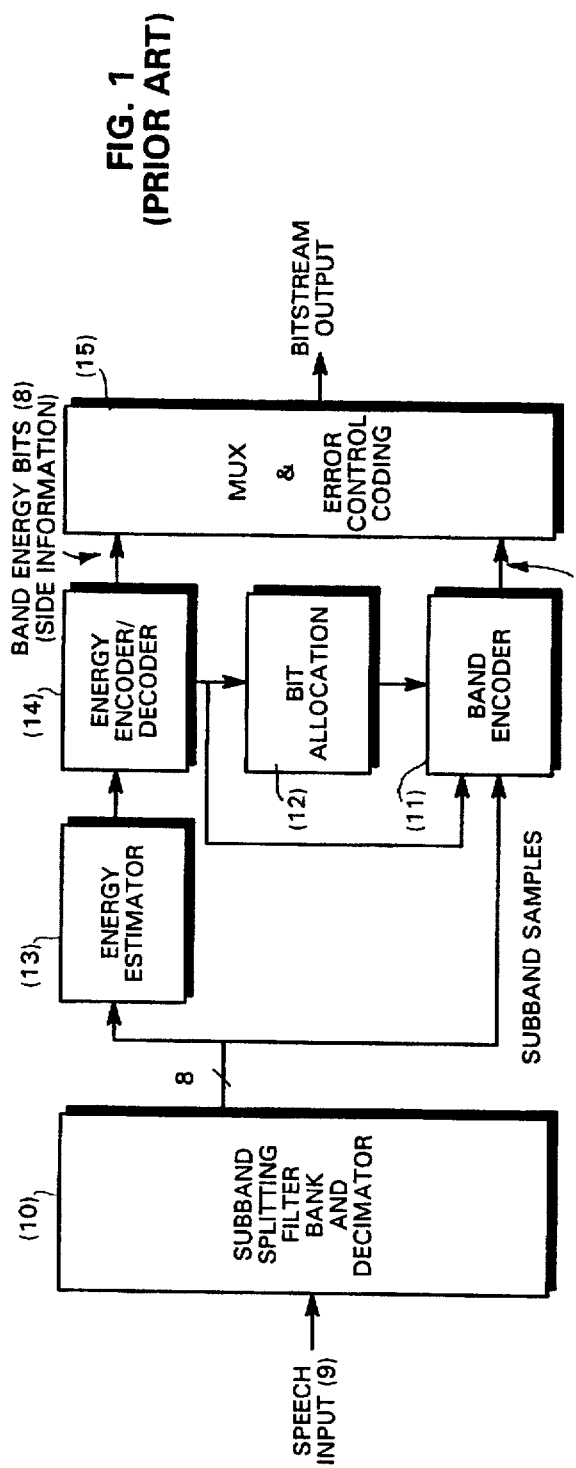
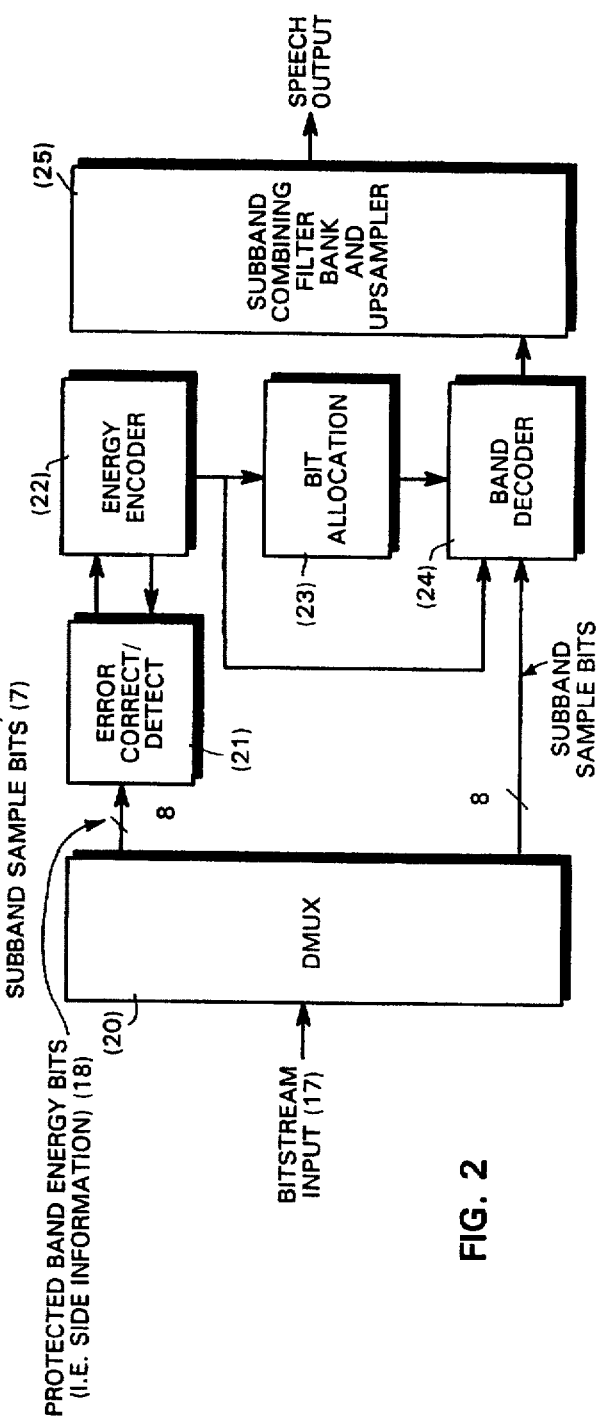
FIG. 1 (PRIOR ART)
FIG. 2

ENHANCED FADING AND RANDOM PATTERN ERROR PROTECTION FOR DYNAMIC BIT ALLOCATION SUB-BAND CODING

FIELD OF THE INVENTION

This invention relates to coding, transmitting and detecting errors in a digital signal. In particular, the invention relates to bit error detection and correction in radio frequency (RF) transmissions of digital signals.

SUMMARY AND BACKGROUND OF THE INVENTION

Dynamic Bit Allocation Sub Band Coders (DBASBCs) are typically used for coding and digital transmission of speech signals. In portable/mobile radio environments, such digitally coded speech signals are subject to a variety of impairments. For example, fading pattern errors are induced as the radio moves through direct and reflected wave patterns. Fading errors are manifested as quasi-periodic bursts of dense bit errors (10–50% of the received bits may be in error). In addition, random pattern errors resulting from an overall weak received signal level are manifested as static occurrences of occasional errors (0–10% of the received bits in error).

Sub-band coders operate by dividing the incoming digital signal, e.g., digitized speech samples, into separate frequency bands. These bands are usually identical in bandwidth, such as for a dynamic bit allocation coder, but may be of different widths. Splitting digital input signals into bands is accomplished using digital filters, either arranged in parallel (1 filter per band) or in a tree structure (a cascaded, binary tree of half-band split filters). The outputs of these filters are digitally decimated to permit reduction of their effective sampling rate to the required Nyquist bandwidth before transmission, e.g., two times the filter bandwidth. The decimated sub-band signals are then individually coded for transmission. This coding usually takes the form of a scalar (1-dimensional) quantizer.

Sub-band coders achieve positive coding gains by allocating a variable number of quantization bits to the individual frequency bands according to the energy level of the signal presently in that band. Coding gain is the gain in signal-to-noise ratio of a coding algorithm over the signal-to-noise ratio of a scalar quantizer operating at the same transmission (bit) rate. Since the spectrum of speech signals varies significantly over time, the allocation of quantization bits needs to be periodically updated. The combination of variable bit allocation used together with a sub-band coder is DBASBC.

The energy level of each sub-band is also used in computing the correct scaling for the individual band quantizers step sizes. Because both bit allocation and quantizer scaling information are contained in the energy level for each frequency band, energy levels are transmitted to the receiver as "side" information. The receiver and transmitter use the same algorithms to extract the bit allocation information and quantizer scaling information from the energy levels.

The bits used to code the sub-band energies are sensitive to error. In fact, a single, well-placed bit error in a sub-band energy level can cause the bit allocation algorithm in the receiver to mistrack resulting in incorrect decoding of all the sub-band samples in a frame. Accordingly, energy bits are usually heavily protected to guard against such errors.

Previous protection methods for digital transmissions treat the entire set of energy values as a single entity. For example, U.S. Pat. No. 4,831,624 discloses a single cyclic redundancy code (CRC) checksum to detect differences in the bit allocation from transmitter to receiver. If the CRC detects a mismatch, the entire set of energy values from the previous frame is used in place of the values producing the erroneous bit allocation. While this algorithm works adequately for fading errors, it has a serious failing when subjected to random pattern errors. Because a single error in the significant energy bits causes the single CRC check to indicate a failure, the probability that a frame will need to be replaced is many times greater than the probability of any one bit in the frame being in error. For example, if there are 20 "sensitive" bits and the probability of a single bit error is 0.05 (i.e., 5% random pattern BER), then the probability of replacing the entire set of energies is about 0.64 or 64%. This produces unintelligible garble at the sub-band coder output, since only 36% of the receiver bit allocations will be correct. Accordingly, a more powerful algorithm is required to handle both random and fading pattern errors.

A novel strategy of protection of the DBASBC-encoded speech from bit errors is disclosed in commonly owned U.S. Pat. No. 5,384,793. Only the most perceptually significant bits corresponding to the sub-band energy levels are protected. The significant bits corresponding to each energy value are protected individually using a separate error detection/correction decision for each energy. As a result, a single bit error does not cause replacement of the entire set/frame of energies. More specifically, the strategy developed in U.S. Pat. No. 5,384,793 protected the energy information (1) by correcting any correctable error in the protected bits and (2) by detecting conditions where the errors cannot be corrected and then estimating what the decoded energy should have been using the values of the corresponding energy from the previous frame and the energies of the sub-band adjacent to the current sub-band. This latter estimation operation is referred to as "synthetic regeneration."

These two protection strategies remedy to a large extent the two types of channel impairments noted above: fading pattern errors and random pattern errors. Individual bit error correction is particularly useful for improving performance in the presence of fading pattern errors. Unfortunately, all error correction schemes break down when the bit error rate (BER) increases beyond a certain point. That point typically occurs sometime during fading pattern errors. However, the detection and regeneration scheme disclosed in U.S. Pat. No. 5,384,793 is sufficiently robust to detect almost any error pattern. Of course, both bit error correction and synthetic regeneration are useful with bit error correction playing a major role at low BERs and synthetic regeneration taking over at higher BERs.

Notwithstanding the significant benefits provided by the strategy developed in U.S. Pat. No. 5,384,793, the inventors of the present invention discovered that the specific synthetic regeneration method in that patent did not perform particularly well in certain BER conditions even though those BER conditions were detected. Namely, the DBASBC produced noises in BER conditions, in particularly high BER conditions, that sounded like gunshots, pops, bangs, etc. referred to as "artifacts." These types of artifacts are of course usually undesirable in any radio application/setting, but they are unacceptable in a police or other public safety radio application.

Thus, it is an object of the present invention to overcome this drawback and provide a technique implemented by a DBASBC that improves these two fading pattern error and random pattern error protection strategies described above by providing a further bit error protection strategy to handle BER conditions that lead to gunshot-type noises and other undesirable artifacts.

In general, the added protection strategy detects an unacceptable bit error condition over a certain number of speech frames and, when appropriate to prevent the above-described artifacts, selectively mutes the output of the speech coder. If the unacceptable bit error condition is detected as a fade condition but is not sufficient to warrant muting of the speech frame, the speech frame is deemed corrupted. As a result, the energies for the bands in the current speech frame are replaced with the band energies from the previous frame (assuming the previous frame energies are reasonable values). Otherwise, the individual band energies are examined one by one. If the individual band energy requires correction, the band energies are replaced individually as needed. In addition, the energy replacement values are checked for reasonableness.

In a DBASBC in accordance with a preferred, example embodiment of the invention, eight (8) sub-band energies are encoded with scalar, non-uniform quantizers. Energies for frequency bands 1 through 6 are quantized with four (4) bits each, and energies for bands 7 and 8 are quantized with three (3) bits each. The bits for each energy correspond to an index of the non-uniform quantizer's output level table. The indices are encoded with binary code and ordered with increasing values of the output level table. For example, the binary value "111" corresponds to the maximum quantizer output value of a 3 bit quantizer, and the value "000" corresponds to the minimum level. Since an error in the most significant bit (MSB) of the binary code for each energy level has a much larger effect on the output speech than an error in the least significant bit (LSB), the most significant bit(s) of the binary code assigned to each band's energy level are specially protected using redundant bits in the encoding process.

During decoding, errors in the protected bits are corrected using a majority vote correction algorithm. In addition to bit error correction, the decoding algorithm produces a "confidence score" for each coded energy value based on the voting results. If the errors cannot be corrected, i.e., a sum of the energy value confidence scores exceeds a threshold, a muting analysis is performed. When a predetermined number of frames of speech have energy value confidence scores greater than the threshold, a muting operation is performed for the energies in all of the sub-bands. If after muting, a predetermined number of frames of speech have energy value confidence scores less than the threshold, the muting operation is disabled.

When the bit errors are too high indicating a fade but muting is not yet enabled, the entire set of band energies is replaced. An estimate is generated for each band energy based on previously received data. When a low level of bit errors is detected and muting is not enabled, an error detection mechanism is activated that examines each received energy value individually. In other words, an individual energy value can be corrected instead of replacing the entire set of energy values in the frame. Each band energy estimate is checked against a threshold to assure that the replacement energy is reasonable. If the estimate is greater than the threshold, an average energy based on the current speech frame is used as the replacement/estimate. Because fewer protected bits are grouped together for the purpose of error detection, as compared to grouping all bits representing all the energy values (typically 2 or 3 bits, instead of 20), the probability of replacing or regenerating the energy values is dramatically reduced.

Accordingly, the comprehensive bit error protection and regeneration strategy in accordance with the present invention including the use of muting where necessary and the comparison of computed replacement energy for the individual band against certain thresholds prevents the generation of objectionable artifacts that occur at certain BER conditions.

BRIEF DESCRIPTION OF THE DRAWINGS

FIG. 1 is a block diagram of a prior art DBASBC transmitter;

FIG. 2 is a block diagram of a DBASBC receiver;

DETAILED DESCRIPTION OF THE DRAWINGS

Figure 3:
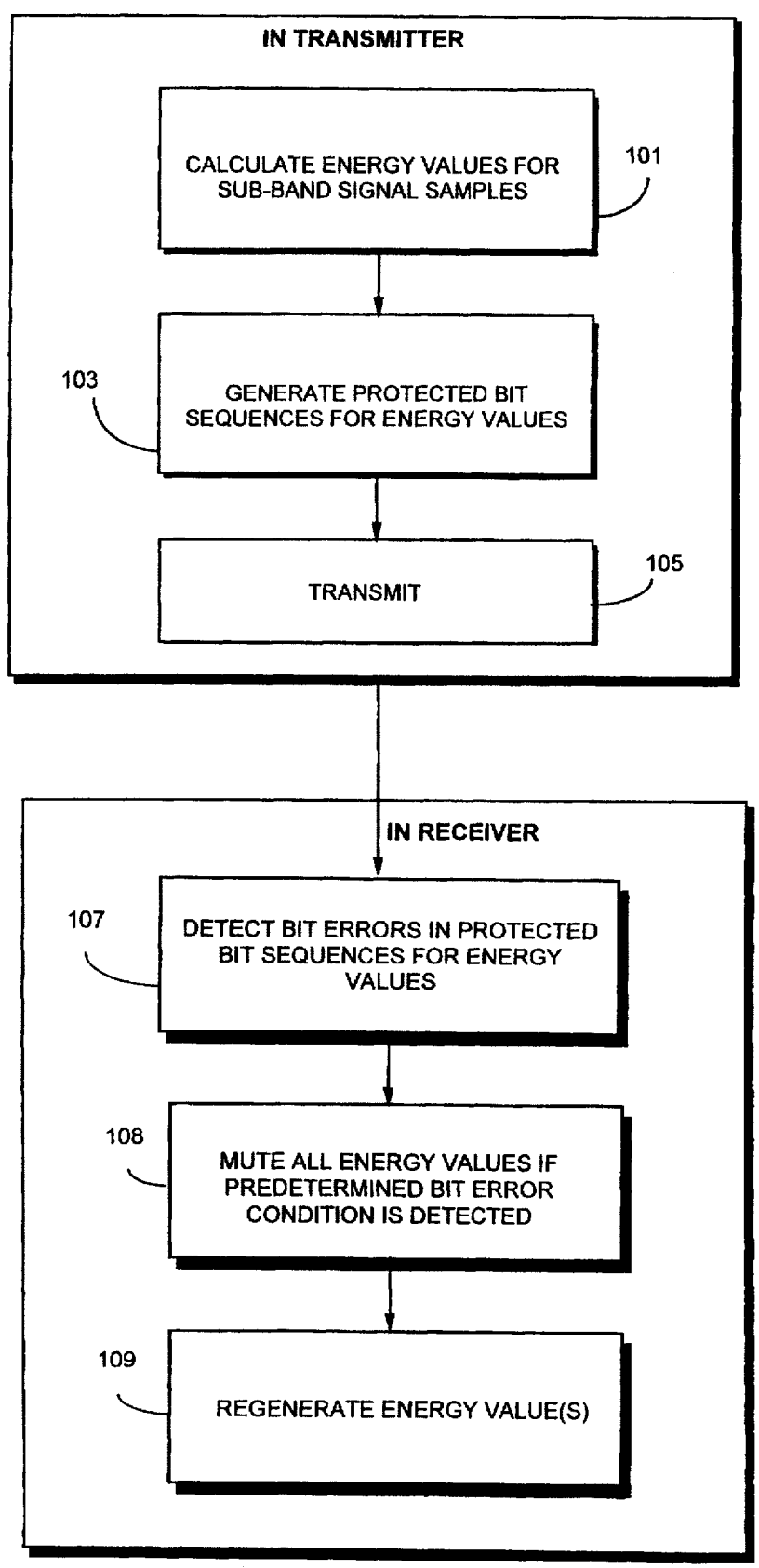
FIG. 3 is a flow chart illustrating a method of practicing one embodiment of the invention.

FIG. 1 shows a block diagram of a prior art DBASBC transmitter. FIG. 3 shows several steps (101-105) for implementing an embodiment of the current invention using a DBASBC transmitter. The incoming digital speech signal (9), which has been digitized and in an analog-to-digital converter (not shown), is split into 8 equal-sized, frequency sub-bands (each sub-band consists of some integer number, e.g., 16, of samples representing the amplitude of the speech waveform in that band) by digital filter bank (10). The signal energy in each sub-band is calculated by the energy estimator (13) using for example the speech amplitude value as shown in step (101) of FIG. 2. The sub-band energies are passed to the energy encoder/decoder (14) which generally consists of a set of scalar quantizers that are tailored to the long term statistics of each energy. Encoder (14) provides two output streams: the bits representing the energies to be sent (band energy bits 8) are directed to multiplexer (15), as shown in step (103), and the decoded values of the energies are provided to the bit allocation means (12) and to the band encoder (11).

Use of the decoded values of the energy allows the DBASBC receiver and transmitter to track correctly. Bit allocator (12) allocates the available bits to each band based on the decoded energy level. In other words, those bands that have more energy are allocated more bits and those with less energy are allocated fewer bits. Band encoder (11) quantizes and encodes the sub-band signals (sub-band sample bits) according to the allocation received from bit allocator (12) and computes the proper quantizer scaling from the decoded energy received from the energy encoder/decoder (14). The quantized sub-band samples and the encoded energy levels are combined in multiplexer (15) for transmission. Extra bits are added for error control coding in the multiplexer.

FIG. 2 shows a block diagram of the DBASBC receiver, and FIG. 3 shows steps (107-109) for implementing an embodiment of the current invention using a DBASBC receiver. Received bits (17) sent from the transmitter (step 105 of FIG. 3) are unpacked by demultiplexer (20) and separated into bits representing the sub-band energy (18) and sub-band samples (19). The bits associated with the sub-band energy are examined for errors by the error correction/detector (21) step 107 of FIG. 3. The error corrector (21) is integrated with the energy decoder (22) to take advantage of the correlation between adjacent flames.

Decoded energy values are passed back and forth between corrector (21) and decoder (22).

As in the transmitter, the bit allocator (23) receives the energy from decoder (22), and sends the bit allocation on to the band decoder (24). Band decoder (24) uses the bit allocation and decoded energy from decoder (22) to decode the sub-band samples. The output speech is reconstructed by filter (25) from the decoded sub-band samples.

Figure 4:
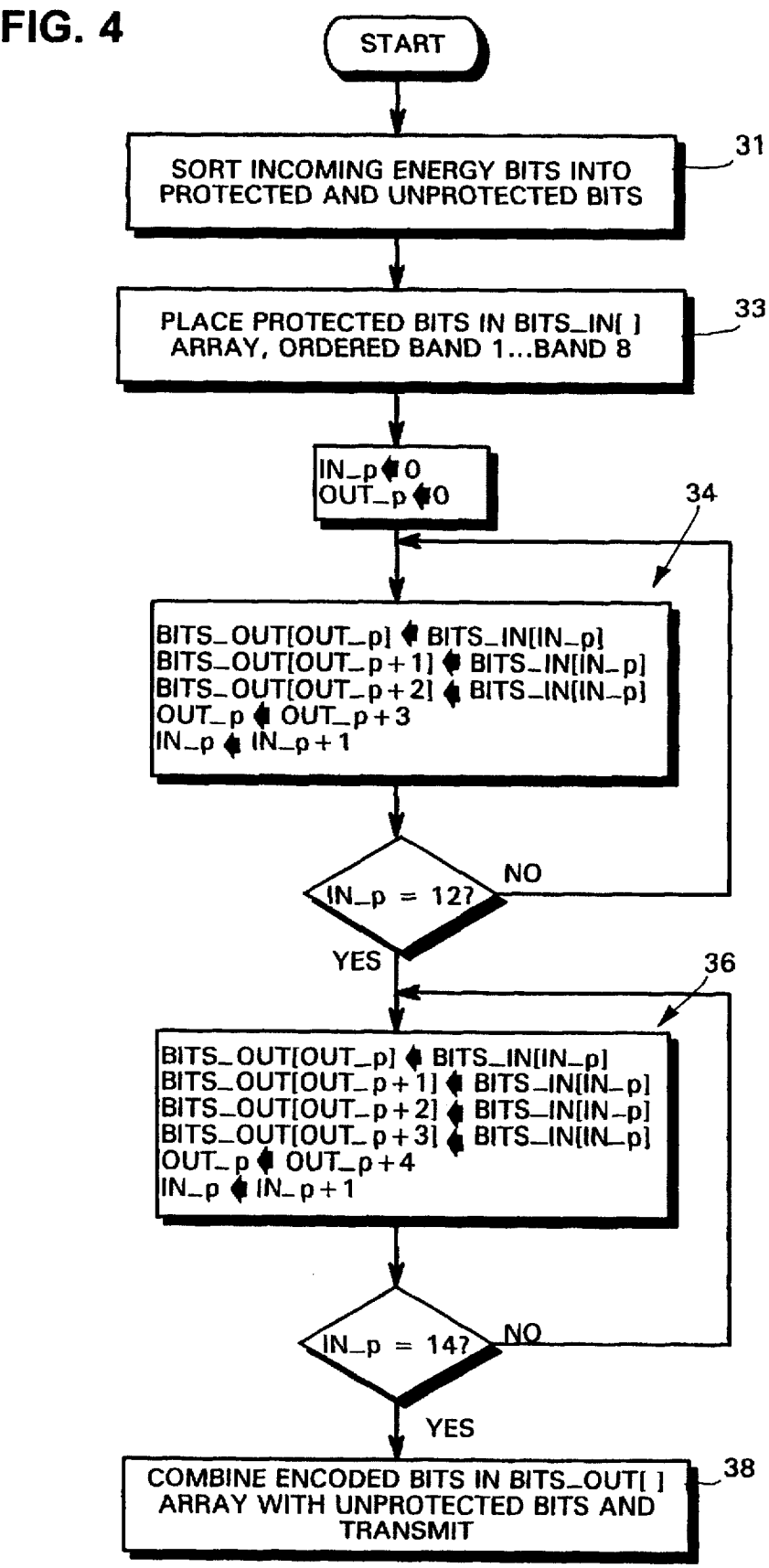
FIG. 4 is a flowchart of the encoding algorithm.

FIG. 4 shows the flow of the encoding algorithm applied in the transmitter. In step 31, the incoming energy values are sorted into bits to be protected and bits not to be protected. The protected bits for each energy band are usually the most significant bits(s) such as defined in Table I (step 33).

TABLE 1 the 2 MSBs of the energy of band 1
the 2 MSBs of the energy of band 2
the 2 MSBs of the energy of band 3
the 2 MSBs of the energy of band 4
the 2 MSBs of the energy of band 5
the 2 MSBs of the energy of band 6
the MSB of the energy of band 7
the MSB of the energy of band 8

As evident from Table 1, there are a total of fourteen protected bits.

In step 34, the two MSBs of each of the first six bands are encoded with a "triple repetition" code. That is, each protected bit is repeated three times to produce three output bits. The MSB of band 7 and the MSB of band 8 are each encoded with a "quadruple repetition" code for which four identical output bits are generated for each input bit in step 36. The encoded bits are combined with the unprotected energy bits and transmitted as side information to the signal bit stream output in step 38.

The total overhead for the present encoding scheme is:

(2 protected bits/band)×(2 extra bits)×(6 bands)+(3 extra bits)×(2 bands)=30 bits.

The thirty (30) protection bits are significantly fewer than the fifty-six (56) bits required if eight, 7-bit CRC checksums were applied.

Figure 5:
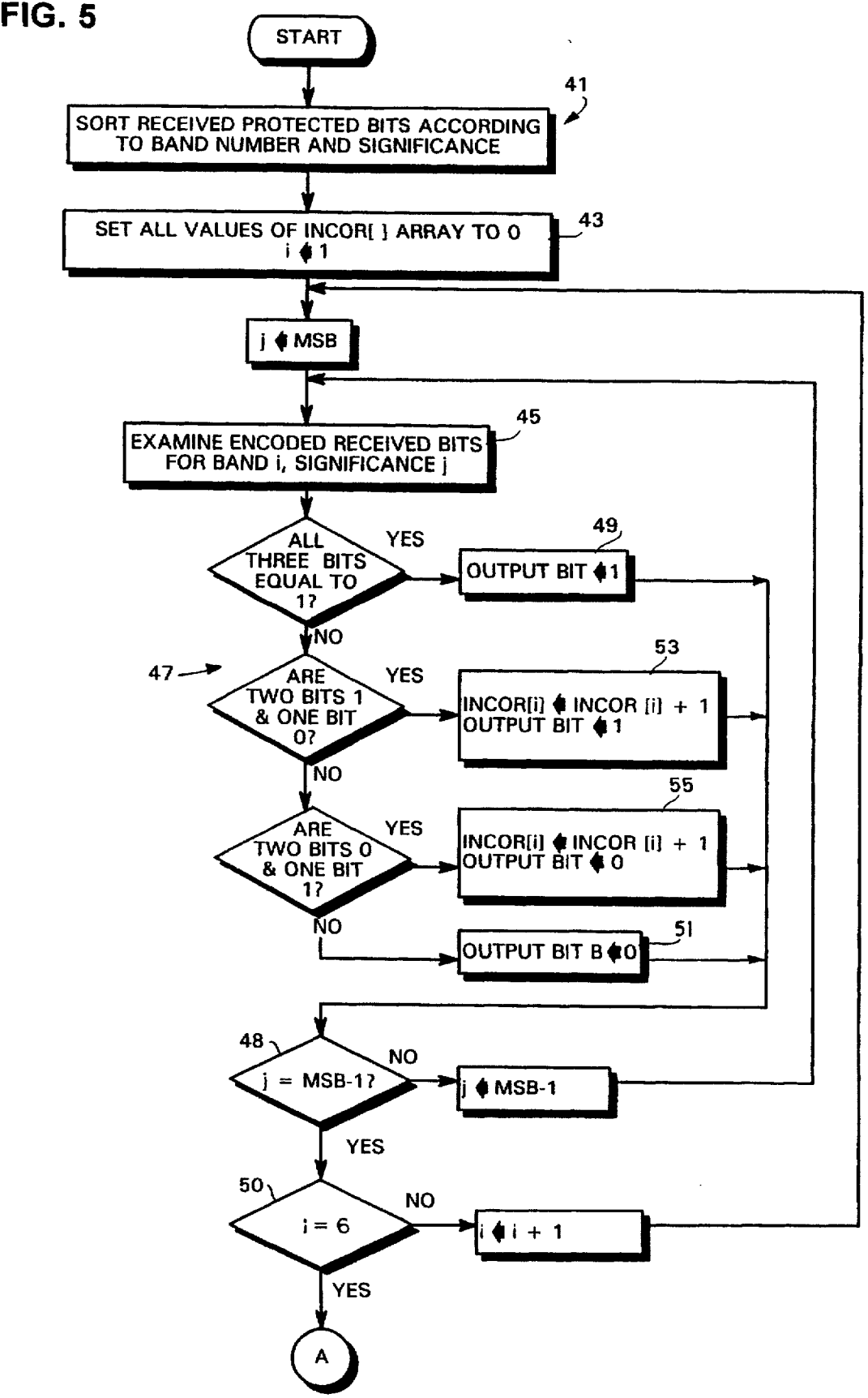
FIG. 5 is a flowchart of the first stage decoding algorithm (part 1)
Figure 6:
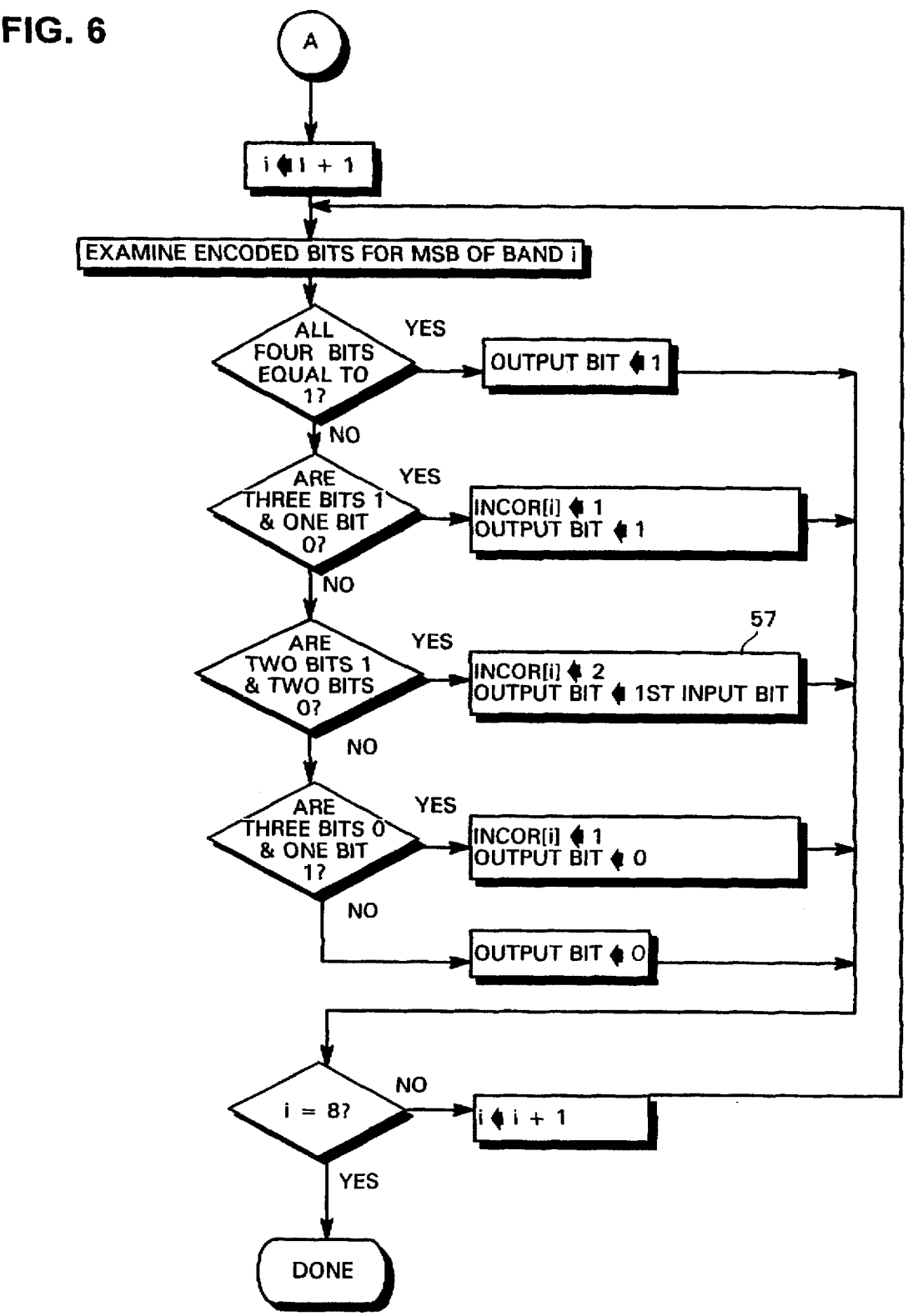
FIG. 6 is a flowchart of the first stage decoding algorithm (part 2)

As shown in FIGS. 5 and 6, the first stage of the decoding scheme applied in the receiver consists of bit error correction and the generation of confidence values. These two figures show the flow of the majority logic decoder for the protected bits. FIG. 5 shows the decoding operation for bands 1 through 6. FIG. 6 is similar to FIG. 5, but shows the decoding for bands 7 and 8.

In step 41, the received protected bit energies are sorted by band number and bit significance. An array (incor[]) for counting questionable protected bits is set to zero in step 43. The output bits for the protected MSBs of each energy value are selected by a simple majority vote over the redundant protected input bits. Accordingly, in step 45 the three bits for each protected bit are voted to select a particular output bit in the steps indicated generally at 47. This vote is repeated for each protected bit in each energy band in loops 48 and 50. A similar voting algorithm is shown in FIG. 6.

In addition to selecting output bits, the decoding algorithm produces a confidence score for each energy, and this score is tallied in the array incor[]. The confidence score represents the likelihood that the voted output bits actually represent the energy value that was transmitted. The confidence score takes on one of three values: 0, which implies high confidence in the output value; 1, which implies that the output may be in question; and 2, which implies that the output is probably incorrect. A high confidence value (0) results when only steps 49 and 51 occur in loop 48. A questionable confidence value (1) results when either steps 53 or 55 occur in addition to either step 49 or 51 in loop 48. A incorrect indicator (2) results when either steps 53 or 55 occur twice in loop 48, or step 57 (in FIG. 6) occurs.

For example, if the confidence score values of the incor[] array are 2,0,1,0,0,1,0,0, for incor[1] through incor[8], respectively, then the interpretation would be that the energy band 1 is most likely incorrect, the energies for bands 3 and 6 could be incorrect, and the remaining energies (for bands 2, 4, 5, 7 and 8) are probably correct. These confidence scores are used in determining which, if any, energy values (not just bits) are to be replaced as indicated generally in step 107 of FIG. 3.

Figure 7A:
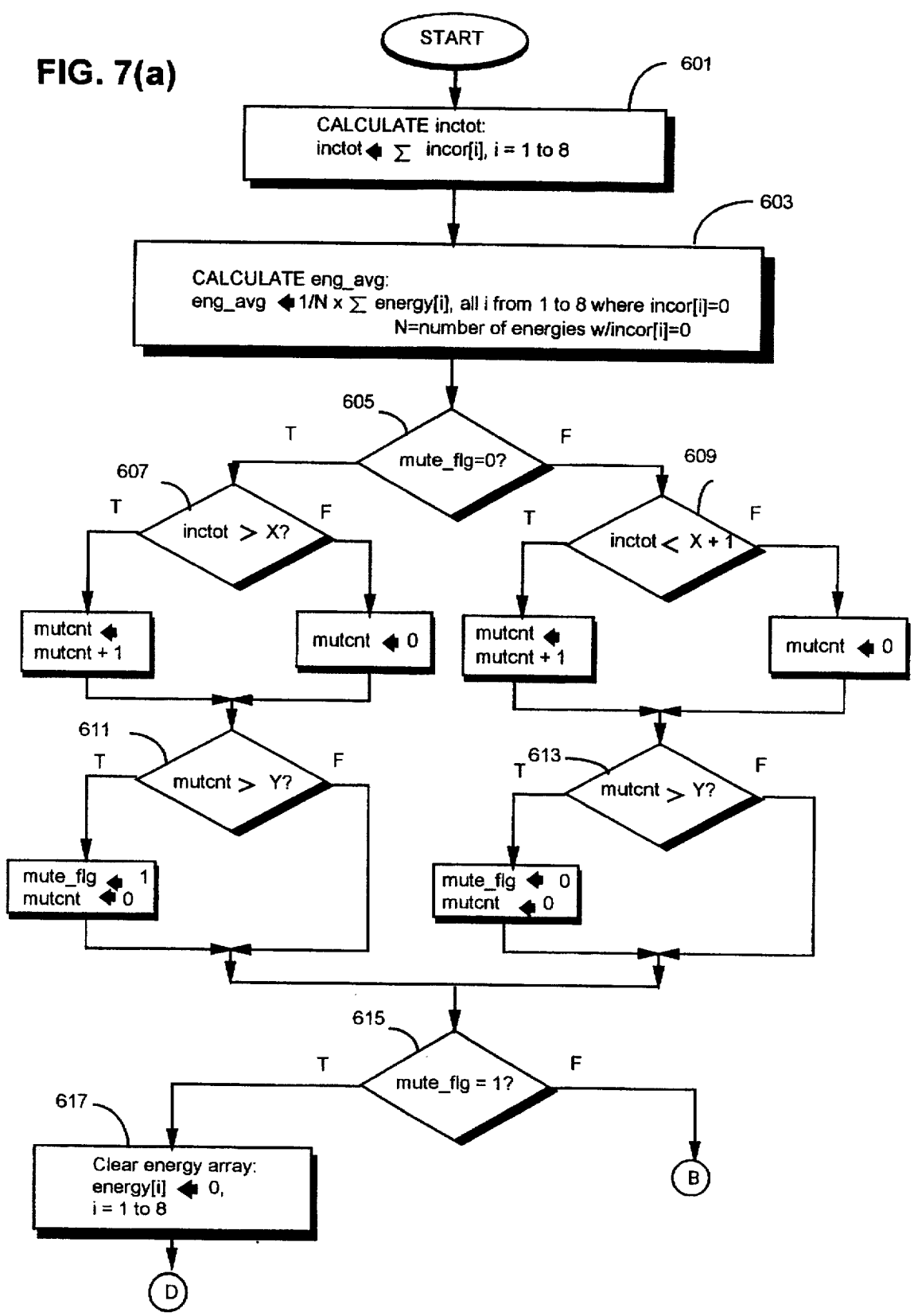
FIGS. 7(a)-7(c) are flowcharts of the second stage decoding algorithm in accordance with the present invention.
Figure 7B:
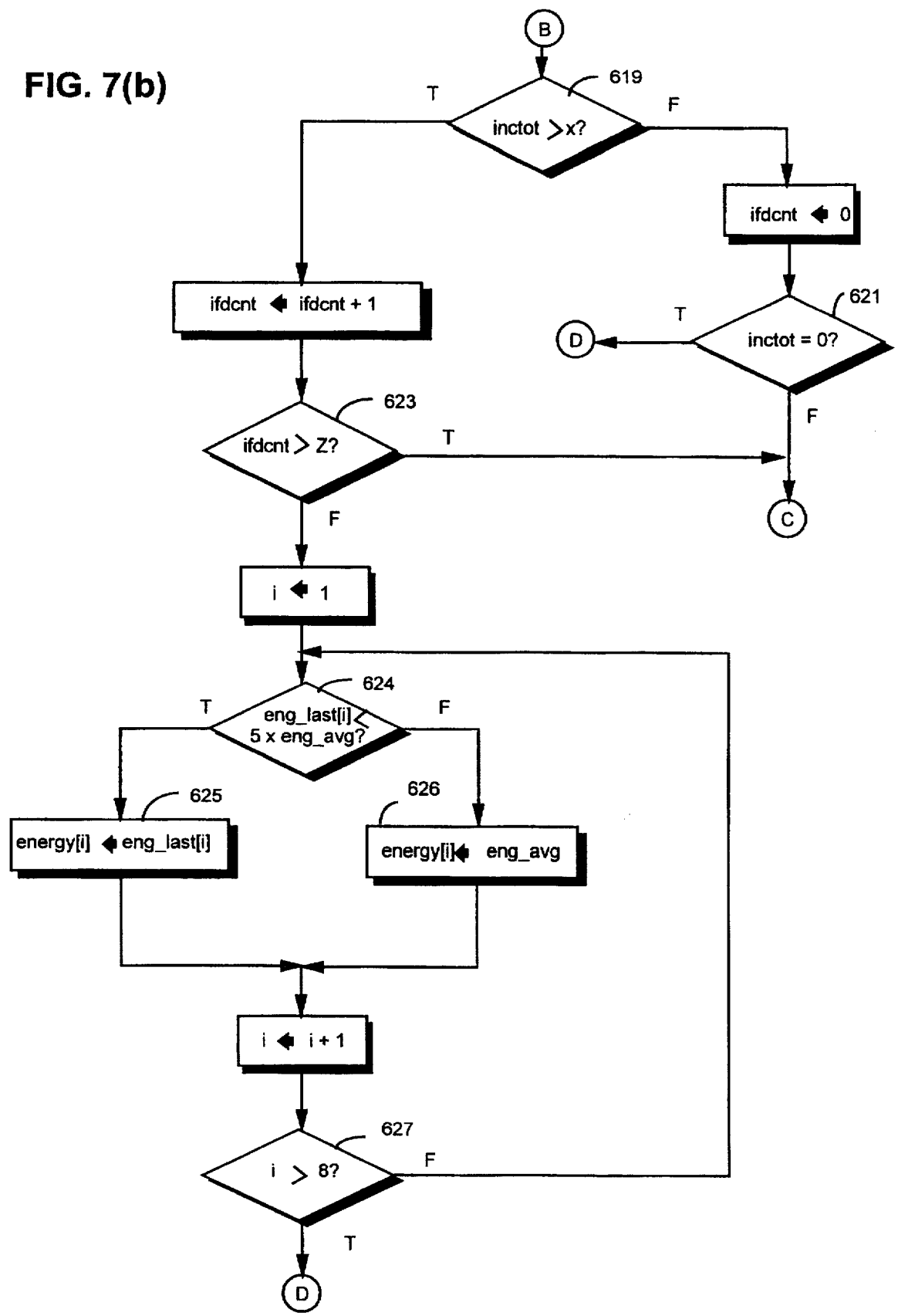
Figure 7C:
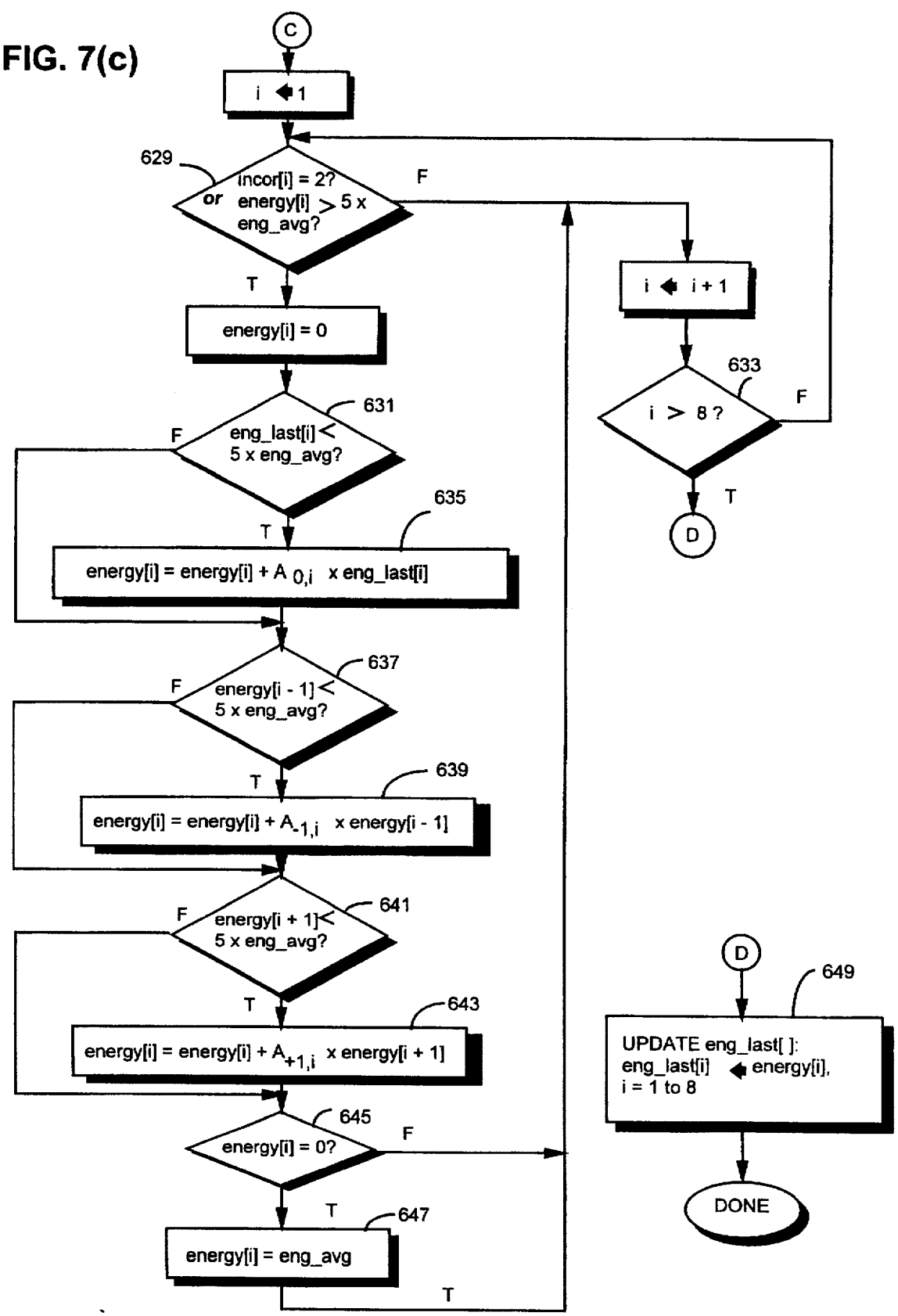

As shown in FIGS. 7(a)–7(c), the second stage of the decoding algorithm consists of interpreting the confidence scores contained in the incor[] array and applying corrective action including if appropriate, muting (step 108 in FIG. 2) and regenerating energy values (step 109 in FIG. 3). Before this algorithm can be applied, the energy values must be decoded from the bits produced from the first stage, and placed in an eight dimensional array called "energy[]". This decoding is performed by standard table look-up techniques to obtain the output value in the quantizer level table using the index formed by the bits corresponding to each energy.

The first step 601 sums the array of eight sub-bad confidence scores incor[] and places the result in a scalar variable named "inctot." The average, non-corrupted energy value "eng_avg" for all eight sub-bands is then calculated in step 603 using the following equation:

$$eng\_avg = \frac{1}{N} \sum_{i=1}^{8} energy[i] \text{ for all } i \text{ where } incor[i] = 0.$$

where N = the number of energies having incor[i]=0.

At decision block 605, a decision is made whether or not a mute flag (mut-fig) has been set, i.e., whether or not the mute flag equals 0 or 1. A value of 0 indicates that muting is currently disabled, while a value of 1 indicates that muting is enabled.

If muting is currently disabled, control proceeds along the left branch of the flowchart shown in FIG. 7(a) to decision block 607 to determine whether the sum of the eight sub-band energy confidence scores is greater than a predetermined threshold value X. While X could be any integer value selected in accordance with the number of sub-bands, the particular bit rate of the DASBC coder, and the permissible bit error rate of the system, in a preferred embodiment, X equals 5. If the value of inctot is greater than X, a count value labelled as mutcnt is incremented. If inctot is less than or equal to X, mutcnt is set to 0. In step 611, mutcnt is examined to see if it is greater than some integer value Y. As with the integer value X described above, Y may change depending upon a number of circumstances, but in the preferred embodiment, Y equals 1. If mutcnt exceeds Y, this indicates that Y consecutive speech frames with the value of inctot greater than X has occurred which is the condition for enabling muting. Thus, the present invention provides for muting when a certain number (Y) of frames (that number Y representing a hysteresis factor) have a sufficiently high sum of confidence scores indicating a high probability that the energies in bands 1 through 8 for that speech frame are corrupted. The hysteresis factor is included to avoid a decision to mute on a very short, noise event. Thus if mutcnt is greater than Y, the mute flag is set to 1 and mutcnt to 0.

Following the right branch from decision branch 605 in FIG. 7(a) where mut_flg does not equal 0 (meaning that muting is currently enabled), a decision is made in block 609 whether inctot is less than X+1. In the preferred embodiment with X being 5, X+1 equals 6. If the value of inctot is less than X+1, mutcnt is incremented. Otherwise, mutcnt is zeroed. The mutcnt is examined in decision block 613 to determine if it is greater than Y. If so, this indicates the occurrence of Y consecutive frames with the value of inctot less than X+1, which is the condition for disabling muting. Therefore, both the mut_flg and mutcnt are zeroed. In step 615, the value of mut_flg is tested. If its value is 1, muting is indicated, and the band energy array energy[i] is zeroed. Thereafter, processing continues at point D in FIG. 7(c). Zeroing the band energy array effectively causes all speech coder output samples to be 0 regardless of any errors in sample value decoding. On the other hand, if the value of mut_flg is not 1, the coder is not muted with processing continuing at point B as described in FIG. 7(b).

FIG. 7(b) describes the processing steps applied when the bit errors for the energy bits in a speech frame (as detected by interpreting the sum of the confidence scores contained in the incor[] array) are not sufficient (e.g., inctot less than X) to justify muting. However, further analysis must be performed to determine if a fade has occurred that corrupts the entire set of energy values in the current speech frame requiring replacement of those values.

Starting in decision block 619, the coder determines if a fade has corrupted the entire set of energy values based on whether or not the value of inctot exceeds X. If it does, the entire frame is deemed corrupted, and a count value ifdcnt is incremented. The count value ifdcnt monitors the number of consecutive frames with inctot greater than X. When one or more consecutive frames up to Z frames are detected with inctot greater than X, the entire energy[] array is replaced using the last energy[] array calculated. However, before that last energy array values are used as replacement values, the array is first tested against a threshold as indicated in step 624 in accordance with the following equation:

$$eng\_last[i] < 5 \times eng\_avg$$

where eng_last[i] is the last energy value for band i calculated for the previous frame and 5×eng_avg is the threshold value. Recall that the average energy was calculated in step 603 in FIG. 7(a). Of course, some number other than 5 could be used to determine what a realistic threshold value should be dependent upon various system parameters and criteria.

If the last energy value is less than the threshold, eng_last[i] is assigned to energy[i]. Otherwise, the last energy value is not a valid replacement and the average energy (eng_avg) is assigned to energy[i]. After replacement of all eight energy values, processing continues at point D in FIG. 7(c).

Returning to the right branch from decision block 619, if the value of inctot is not greater than X or if the counter value ifdcnt is greater than Z (more than Z frames are fully corrupted), individual examination of band energy values and confidence scores is indicated. In the case of inctot not greater than X, the count value ifdcnt is zeroed, and inctot is compared with 0. If inctot equals 0, no bit errors have been detected for the current frame and processing continues at point D in FIG. 7(c). Otherwise, processing continues at point C in FIG. 7(c).

FIG. 7(c) describes a process where band energy values and confidence scores are examined individually. For each band energy, if neither of the conditions of incor[] score being equal to 2 nor the energy[] value for that band being greater than the energy threshold (e.g., five times eng_avg), then there is no change. However, if either condition is present, a replacement energy[] value is computed as a weighted sum of the current band's energy in the previous frame and the two adjacent band's energies in the current frame. This replacement computation differs from that described in U.S. Pat. No. 5,384,793 in that each band energy is included in the weighted sum calculation only if its value is less than the threshold, e.g., five times eng_avg. If all three component energy values are above the threshold as tested in steps 631, 637, and 641, then the current band's energy[] value is replaced by the average energy calculated in step 603 in FIG. 7(a) (step 647). When all three component energy values are below the threshold, the replacement energy value (energy[i]) is represented by the following equation:

$$energy[i] = (A_{o,i} \times eng\_last[i]) + A_{-1,i} \times energy[i-1]) + (A_{+1,i} \times energy[i+1]),$$

This equation is implemented recursively in steps 635, 639 and 643. In essence, this calculated replacement energy value is the weighted sum of the corresponding energy value in the previous frame and the two adjacent energy frames relative to the current frame. The array eng_last[] is the array of the previous frame's energies. The constants $A_{o,i}$, $A_{-1,i}$ and $A_{+1,i}$ can be chosen to minimize the mean-square error (MSE) between the regenerated value and the actual transmitted one. Any standard MMSE estimation technique can be used to generate these constants. The coefficients $A_{-1,1}$ and $A_{+1,8}$ are set to zero because the corresponding energy[0] and energy[9] values are not defined. After the regeneration operations are complete (step 633), the final values of the energy[] array are copied into the eng_last[] array for use in subsequent frames (step 649).

The enhanced protection strategy in accordance with the present invention has been tested with a variety of fading and random pattern channel simulations. In a ten percent random bit environment, the output of the speech coder is still intelligible and only 6.4 percent of the frames are muted. In a 20 percent random bit error environment, where the output of the speech coder using the protection strategy described in U.S. Pat. No. 5,384,793 would have exhibited very objectionable artifacts such as bangs, pops, and shots, 94 percent of the frames are muted, and only negligible artifacts are present when the enhanced protection strategy of the present invention is used.

The enhanced protection strategy in accordance with the present invention was also fully tested in fading error patterns. Simulation results were generated for the following combinations of vehicle speed and carrier frequency; 10 mph/450 MHz, 30 mph/450 MHz, 60 mph/450 MHz, and 60 mph/800 MHz. The average bit error rate for the test was 10 percent. In all of these test cases, the enhanced protection strategy in accordance with the present invention eliminated 99 percent or more of the perceptually objectional artifacts in the output speech.

The invention has been described in connection with what is presently considered to be the most practical and preferred embodiment. The invention is not limited to the disclosed embodiment, but is intended to cover various modifications and equivalent arrangements included within the spirit and scope of the appended claims.

What is claimed is:

1. A method for communicating signals using sub-band coding, comprising the steps of:

a. generating for signal samples from plural frequency bands, a band energy bit sequence representing an individual band energy value for each of the plural frequency bands;

b. protecting one of the significant bits in some or all of the band energy bit sequences;

c. transmitting and receiving frames of data, each data frame including protected bits with corresponding sub-band coded signal samples;

d. determining for a received data frame a number of bit errors in the protected bits;

e. muting the sub-band coded signal samples in the data frame if the determined number of bit errors exceeds a threshold under a first condition; and f. replacing the energy values for a currently received frame of sub-band coded signal samples if the determined number of bit errors exceeds the threshold under a second condition including replacing an individual band energy value with a previous corresponding band energy value if the previous corresponding band energy is less than a predetermined energy value.

2. The method in claim 1, wherein the first condition is the number of bit errors determined for a predetermined number of consecutively received data frames.

3. The method in claim 1, wherein the protecting step (b) includes repeating the one significant bit.

4. The method in claim 1, further comprising:
replacing an individual band energy value with an average band energy value if the previous corresponding band energy value exceeds the predetermined energy value.

5. The method in claim 4, wherein the second threshold is based on the average band energy.

6. The method in claim 1, wherein for some of the energy bit sequences, plural most significant bit sequences are repeated.

7. The method in claim 6, wherein the detecting step includes:
voting for at least some of the plural frequency bands, the received repeated significant bits;
developing a confidence score for voted bits for each energy band representing a likelihood that the voted bits actually represent corresponding transmitted bits; and
using the confidence scores to determine which if any band energy values should be replaced.

8. The method in claim 7, further comprising:
regenerating individual energy values for each band energy value that is determined should be replaced.

9. The method in claim 1, wherein the determining step includes determining an individual confidence score for each received band energy value, and determining a total of the individual confidence scores, the muting step being performed when the total confidence score fails to exceed a first confidence level.

10. The method in claim 9, wherein if the total confidence score does not exceed the first confidence level but is greater than a second confidence level, the method further comprises for each band:
examining the band's individual confidence score;
determining whether the band's individual confidence score exceeds a first preset value or whether the band's received energy value exceeds a second preset value;
calculating a replacement energy value if either the band's individual confidence score exceeds a first preset value or the band's received energy value exceeds a second preset value; and
substituting the replacement energy value for the band's energy value.

11. The method in claim 10, wherein the replacement energy value is calculated based on a weighted sum of a previously received band energy and adjacent currently received band energies, and the method further comprises:
comparing each of the previously received and the adjacent currently received band energies with an individual band energy threshold, and
generating the replacement energy value using those of the previously received and the adjacent currently received band energies that are less than the band energy threshold.

12. The method in claim 11, wherein if none of the previously received and the adjacent currently received band energies are less than the band energy threshold, substituting an average band energy for the band energy.

13. A method for communicating signals using sub-band coding, comprising the steps of:

a. generating for signal samples from plural frequency bands, a band energy bit sequence representing an individual band energy value for each of the plural frequency bands;

b. protecting one of the significant bits in some or all of the band energy bit sequences;

c. transmitting and receiving protected bit sequences with corresponding sub-band coded signal samples;

d. determining for a received speech frame, a number of bit errors in the protected bits; and e. replacing the energy values for a current speech free if the number of bit errors exceeds a preset number for less than a predetermined number of speech frames including replacing an individual band energy value with a previous corresponding band energy value if the previous corresponding band energy value is less than a threshold energy value, and replacing an individual band energy value with an average band energy value if the previous corresponding band energy value exceeds the threshold energy value.

14. The method in claim 13, wherein the threshold energy value is based on an average band energy.

15. The method in claim 13, wherein the determining step includes determining an individual confidence score for each received band energy value, and determining a total of the individual confidence scores, the replacing step being performed when the total confidence score exceeds the preset number.

16. A method for communicating signals using sub-band coding, comprising the steps of:

a. generating for signal samples from plural frequency bands, a band energy bit sequence representing an individual band energy value for each of the plural frequency bands;

b. protecting one of the significant bits in some or all of the band energy bit sequences;

c. transmitting and receiving protected bit sequences with corresponding sub-band coded signal samples;

d. determining a bit error in protected bits of a received bit sequence;

e. for each band, developing a confidence score that represents a likelihood that the received protected bits actually represent a corresponding transmitted protected bit;

f. examining individual confidence scores for each band energy;

g. determining if a first condition of an individual confidence score exceeding a first preset value or a second condition of an individual band energy exceeding a second preset value exists;

h. calculating a replacement energy value if either the first or the second condition exists; and i. substituting the replacement energy value for the band energy.

17. The method in claim 16, further comprising:

calculating the replacement energy value based on a weighted sum of a previously received and adjacent currently received band energies;

comparing each of the previously received and the adjacent currently received band energies with an individual band energy threshold; and generating the replacement energy value using those of the previously received and the adjacent currently received band energies that are less than the band energy threshold.

18. The method in claim 17, wherein if none of the previously received and the adjacent currently received band energies are less than the band energy threshold, substituting an average band energy for the band energy.

19. The method in claim 17, wherein each of the previously received and adjacent currently received band energies is multiplied by a corresponding weight selected to minimize a mean square error between the replacement energy value and a corresponding transmitted band energy value.

20. In a sub-band coded speech communications system where bits corresponding to sub-band energy levels are protected before transmission, a method for compensating for random and fading errors corrupting the protected bits, comprising the steps of:

determining if a protected bit error rate for a first received speech frame exceeds a threshold;

determining if a protected bit error rate for a second received speech frame exceeds the threshold;

zeroing speech samples for the second or a subsequent received speech frame if the protected bit error rates determined for the first and second received speech frames exceed the threshold: and if the protected bit error rates for the first and second received speech frames do not both exceed the threshold, replacing band energies for the second speech frame with corresponding band energies of a previous speech frame if the previous band energies are below a preset value.

21. In a sub-band coded speech communications system where bits corresponding to sub-band energy levels are protected before transmission, a method for compensating for random and fading errors corrupting the protected bits, comprising the steps of:

determining if a protected bit error rate for a first received speech frame exceeds a threshold:

determining if a protected bit error rate for a second received speech frame exceeds the threshold:

zeroing speech samples for the second or a subsequent received speech frame if the protected bit error rates determined for the first and second received speech frames exceed the threshold; and if the protected bit error rates for the first and second received speech frames do not both exceed the threshold, replacing individual band energies for the second or a subsequent speech frame which are corrupted or other wise unreliable with replacement energy values below a preset value.

* * * * *